(12) United States Patent
Tournois et al.

(10) Patent No.: US 10,909,439 B2
(45) Date of Patent: Feb. 2, 2021

(54) SYSTEM FOR SAFEGUARDING A PERSON FROM AN AUTONOMOUSLY OPERATING MACHINE

(71) Applicant: PILZ GMBH & CO. KG, Ostfildern (DE)

(72) Inventors: Jan Tournois, Vianen (NL); Max Veenman, Vianen (NL)

(73) Assignee: PILZ GMBH & CO. KG, Ostfildern (DE)

( * ) Notice: Subject to any disclaimer, the term of this patent is extended or adjusted under 35 U.S.C. 154(b) by 0 days.

(21) Appl. No.: 16/274,515

(22) Filed: Feb. 13, 2019

(65) Prior Publication Data

US 2019/0258913 A1 Aug. 22, 2019

(30) Foreign Application Priority Data

Feb. 16, 2018 (EP) ..................................... 18157244

(51) Int. Cl.

| | |
|---|---|
| G06F 17/00 | (2019.01) |
| G06K 19/077 | (2006.01) |
| H04W 4/80 | (2018.01) |
| H04W 4/40 | (2018.01) |
| F16P 3/00 | (2006.01) |
| G05D 1/00 | (2006.01) |
| G05D 1/02 | (2020.01) |
| F16P 3/14 | (2006.01) |
| B25J 9/16 | (2006.01) |
| B25J 19/06 | (2006.01) |

(52) U.S. Cl.
CPC ...... *G06K 19/07762* (2013.01); *B25J 9/1674* (2013.01); *B25J 19/06* (2013.01); *F16P 3/00* (2013.01); *F16P 3/147* (2013.01); *G05D 1/0055* (2013.01); *G05D 1/0214* (2013.01); *H04W 4/40* (2018.02); *H04W 4/80* (2018.02); *G05B 2219/40202* (2013.01); *G05D 2201/0216* (2013.01)

(58) Field of Classification Search
USPC .................................................. 235/383, 385
See application file for complete search history.

(56) References Cited

U.S. PATENT DOCUMENTS

| | | | |
|---|---|---|---|
| 6,695,207 B1 * | 2/2004 | Norris, Jr. ............... | B60R 25/24 235/382 |
| 2015/0049911 A1 | 2/2015 | Doettling et al. | |
| 2016/0062345 A1 | 3/2016 | Stubbs et al. | |
| 2016/0271800 A1 | 9/2016 | Stubbs et al. | |
| 2016/0379473 A1 | 12/2016 | Bharti et al. | |

* cited by examiner

*Primary Examiner* — Jamara A Franklin
(74) *Attorney, Agent, or Firm* — Harness, Dickey & Pierce, P.L.C.

(57) ABSTRACT

System for safeguarding a person from an autonomously operating machine. The system comprises a safety controller for asserting control over the autonomously operating machine based on an input signal generated by a body-worn. The body-worn device comprises safety means for ensuring failsafe locking and arrangement of the body-worn device on the person in a predefined manner. Furthermore, the body-worn device is configured to generate the input signal only when the body-worn device is locked and arranged in said predefined manner.

20 Claims, 4 Drawing Sheets

SYSTEM FOR SAFEGUARDING A PERSON FROM AN AUTONOMOUSLY OPERATING MACHINE

CROSS-REFERENCES TO RELATED APPLICATIONS

This application claims priority from European patent application EP 18 157 244.7 filed on Feb. 16, 2018. The entire content of the priority application is incorporated herein by reference.

BACKGROUND OF THE INVENTION

The present disclosure relates to a system for safeguarding a person from an autonomously operating machine and a corresponding method. Further, the present disclosure relates to a body-worn device for safeguarding a person from an autonomously operating machine.

In the industrial environment more and more autonomously operating machines are being used. Autonomously operating machines operate independently in a defined workspace without or with only little control by an operator. Examples of autonomously operating machines are inter alia independent robots, automated guided vehicles (AGV) of a driverless transport system or autonomous cranes.

As any other installation, autonomously operating machines have to adhere to relevant safety standards in order to be approved by the competent authorities. In particular, autonomously operating machines have to be designed such that they pose no threat to persons or objects, which reside in the same workspace. This can be achieved by isolating the autonomously operating machines spatially by means of fixed installations, such as fences or barriers, and by ensuring that the machines are only turned on, when the work area is sealed off with no persons and objects inside. The spatial separation allows a high degree of safety, yet it is generally expensive, inflexible, and severely limits the autonomously operating machines in exploiting their full potential.

Furthermore, not every process can be fully automated so far and operators have to be onside in various situations at least temporally. However, with fixed installations and static safety means it would be required to turn off the autonomously operating machines each time an operator accesses the workspace. This significantly reduces the overall availability of the machines.

As an alternative, each autonomously operating machine can be equipment with its own safety equipment, which moves along with the machine and monitors dynamically the changing work area of the machine. However, depending on the complexity of the autonomously operating machine such safety equipment can be extremely difficult to implement and has to be adapted for each autonomously operating machine individually. This can result in a complex and expensive safety concept.

SUMMARY OF THE INVENTION

It is an object of the present invention to provide a system for safeguarding a person from an autonomously operating machine which can be implemented in a cost effective manner. Further, it is an object to provide a system for safeguarding a person from an autonomously operating machine which increases the availability. Yet further, it is an object to provide a system for safeguarding a person from an autonomously operating machine which facilitates a safe cooperation between machines and operators in a common workspace.

According to an aspect of the present invention there is provided a system for safeguarding a person from an autonomously operating machine comprising a safety controller for asserting control over the autonomously operating machine based on an input signal, and a body-worn device for generating the input signal, wherein the body-worn device further comprises safety means for ensuring failsafe locking and arrangement of the body-worn device on the person in a predefined manner, and wherein the body-worn device is configured to generate the input signal only when the body-worn device is locked and arranged in the predefined manner.

According to another aspect of the present invention there is further provided a method for safeguarding a person from an autonomously operating machine, the method comprising:
  locking and arranging a body-worn device on the person in a predefined manner;
  ensuring failsafe locking and arrangement of the body-worn device on the person, by safety means of the body-worn device;
  generating, by the body-worn device, an input signal; and
  asserting control, by a safety controller, over the autonomously operating machine based on an input signal;
  wherein the body-worn device generates the input signal only when the body-worn device is locked and arranged in the predefined manner.

According to yet a further aspect of the present invention there is provided a body-worn device for safeguarding a person from an autonomously operating machine having safety means for ensuring failsafe locking and arrangement of the body-worn device on the person in a predefined manner, wherein the body-worn device is further configured to generate an input signal for a safety controller only when the body-worn device is locked and arranged in the predefined manner.

It is hence an idea of the present disclosure to create a dynamic safety environment to safeguard operators from autonomously operating machines. In the dynamic safety environment the operators themselves become part of the safety system by using a body-worn device, which interacts with a safety controller of the autonomously operating machines.

The body-worn device, when attached and lock to the person in the predefined manner, can be included in a safety concept as any other known safety sensor such as interlocks, light barriers etc. Thereby, a more flexible safety concept is feasible, which can adapt to the specific needs. Thus, a static safety environment can be enhanced by dynamic safety sensors, which correspond to the movement of a person in a common workspace.

The body-worn device comprises safety means for ensuring failsafe locking and arrangement of the body-worn device in a predefined manner. Thus, the safety means ensure that the body-worn device may be categorized as safety equipment adhering to the relevant safety standards. For instance, the safety means may ensure that the body-worn device itself is compliant to a safety Performance Level d (PL d) of the ISO 13 849 safety standard. Thereby, the body-worn device can effectively replace other safety equipment in a safety concept of autonomously operating machines and may thereby contribute to a more cost effective safety concept.

Having safety equipment associated to operators may further enhance the cooperation between operators and autonomously operating machines in a common workspace. In particular, having safety equipment associated to operators may allow an autonomously operating machine to continue operating even if operators are present in the same workspace. Thereby, the overall availability can be enhanced.

Associating safety equipment to operators, which itself is compliant to relevant safety standards, further allows a more balanced and coordinated safety concept for autonomously operating machines, in which a coordination of the safety equipment attached to the operator and the safety equipment of the autonomously operating machines is feasible. The additional coordination with other (dynamic) safety equipment allows an autonomously operating machine to operator more freely in a common workspace and thus enables the autonomously operating machine to exploit its full potential without being restricted by globally operating safety equipment, which largely blocks any cooperation in a common workspace.

In a refinement the safety means can comprise a failsafe interlocking device for locking the body-worn device on the person in the predefined manner.

A failsafe interlocking device ensures that the body-worn device is locked in the predefined manner. The body-worn device only generates the input signal when the interlocking device is locked. Thereby, it can be ensured in a simple manner that an operator has not lost or deliberately taken off the body-worn device. The refinement thus contributes to the achievement of a high safety performance level in a simple and effective manner.

In a further refinement the safety means can comprise a sensor for determining whether the body-worn device is arranged on the person in the predefined manner.

This refinement contributes further to achieving a high safety performance level. By checking whether the device is arranged correctly, it can be ensured that the device is actually fixed on the person in the correct position. The sensor can operate independently of an interlocking device. In combination the interlocking device and the sensor can then guarantee a safety level up to Performance level d (PL d) of the ISO 13849 safety standard.

In a further refinement the sensor can be configured to detect a vital sign of the person, in particular the heartbeat of the person, only when the body-worn device is locked in the predefined manner.

Checking for a vital sign in order to confirm the correct application of the body-worn device further improves the intrinsic safety of the body worn device and misuse can effectively be excluded. Thereby, a high safety level such as a PL d of ISO 13849 can be achieved.

In a further refinement the body-worn device can comprise an evaluation unit for evaluating a status of the safety means in a failsafe manner, the evaluation unit in particular being of redundant design comprising two individual processing units.

Evaluating a status in a failsafe manner means that there is an additional process of checking the correctness of a determined status. The status can be checked independently by a second evaluation unit and the individual results can be compared with each other in order to determine safely, whether the status of the safety means has been assessed correctly. The evaluation can hence be of dual or multi-channel design in order to determine the current status redundantly.

In a further refinement the safety controller can be further configured to determine a position of the body-worn device in a defined work area of the autonomously operating machine and to control the autonomously operating machine based on the detected position.

In this refinement the current position of the body-worn device is determined and used to assess the current safety requirement. The safety assessment is hence dynamic and changes with the position of the operator wearing the body-worn device. Thereby, a more flexible safety concept is feasible.

In a further refinement the body-worn device can comprise positioning means for determining its current position and the body-worn device is configured to transmit the determined current position to the safety controller.

In this refinement the body-worn device is capable of determining its own position. This may include absolute and/or relative position information as well as further position related information such as a moving vector, speed or acceleration. By providing dedicated position information, a safety concept can be further enhanced.

In a further refinement the autonomously operating machine can be configured to determine whether the body-worn device is within a defined work area of the autonomously operating machine, and to assert control over its process in conjunction with or independently of the safety controller.

In this refinement the autonomously operating machine is capable of detecting a body-worn device within its work area. Thereby, autonomy of the autonomously operating machine may be enhanced, while at the same time the safety of operators is effectively ensured.

In a further refinement the body-worn device can comprise communication means for communicating via a radio communication network, in particular a dedicated short-range radio communication network using ultra wide band technology, and the system can further comprise one or more receivers associated with the safety controller for communicating with the body-worn device via the radio communication network.

In this refinement the body-worn device is able to share additional information with the safety controller. The additional information could be for instance status or position information of the body-worn device. Thereby, the safety concept can be further enhanced, since additional safety related information may be taken into account by the controller.

In a further refinement the safety controller can be configured to locate the body-worn device using location determining means of the radio communication network and to assert control based on the determined location.

According to this refinement the body-worn device may thus be used as part of an indoor navigation system using short-range radio communication. Thereby, position information can be obtained, based on which the safety control can assert control over the autonomously operating machine.

In a further refinement the safety controller can be configured to log and trace the body-worn device within a defined workspace, in which the autonomously operating machine operates.

In this refinement the safety controller keeps track of the body-worn device within the workspace. Thereby, autonomously operated machines can be controlled such that they do not interfere with operators wearing the body-worn device. In case the safety controller loses contact to a registered body-worn device the autonomously operated machines can be put into a safe state, for instance, by shutting off the drives of the autonomously operated machine from a power supply.

In a further refinement the safety controller can be further configured to control access to the defined workspace, and to allow access only to persons having the body-worn device.

According to this refinement the safety controller is capable of restricting assess to the workspace, for instance, using fences with entry points guarded by carousels, light barriers or safety mats. Only operators having a body-worn device, which is interlocked and arranged in the defined manner, are allowed access to the defined workspace. Other persons or persons having a body-worn device that is not, or at least not correctly, signaling an interlocked state will either be prevented from entering the workspace or force the autonomously operated machine to be shut down, when they are entering the workspace. Hence, the safety controller is configured to bring the autonomously operating machine into a safe state, in particular the autonomously operating machine being stopped safely, when no input signal is being received from the logged-in body-worn device. The combination of the various safety components contributes to a save, yet cost-effective, safety implementation.

Further advantages will become apparent from the description and the enclosed drawing.

It goes without saying that the features mentioned before and those that will be explained hereinafter may not only be used in the particularly given combination but also in other combinations or alone without leaving the scope of the present invention.

BRIEF DESCRIPTION OF THE DRAWINGS

Embodiments of the invention are depicted in the drawings and will be explained in further detail in the subsequent description.

DETAILED DESCRIPTION OF THE PREFERRED EMBODIMENTS

Figure 1:
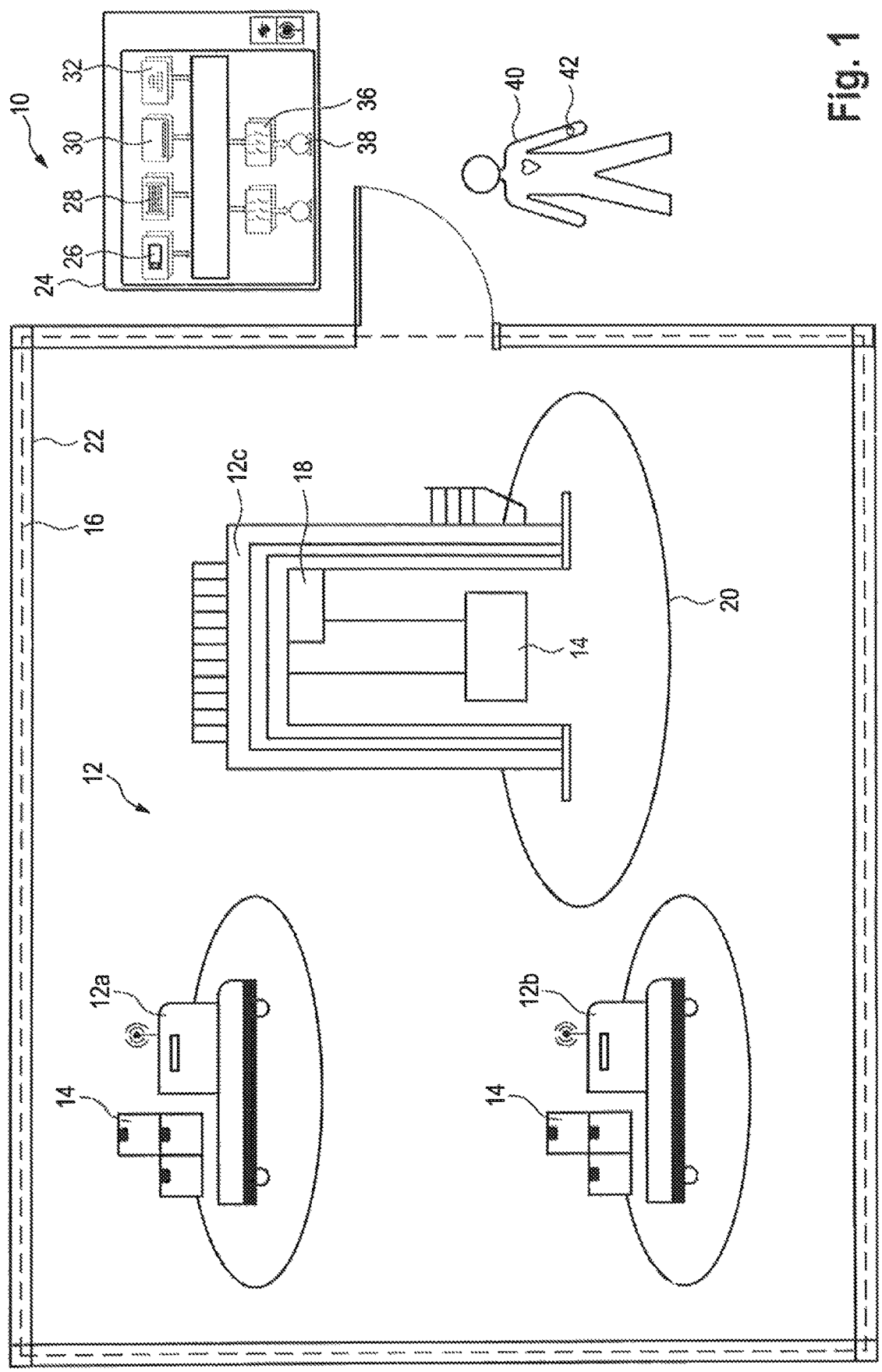
FIG. 1 shows in a schematic depiction an application scenario of an exemplary embodiment of the disclosed system.

FIG. 1 shows an application scenario of an exemplary embodiment of the disclosed system. The system is denoted here in its entirety with reference numeral 10.

In the scenario, two automated guided vehicles 12a, 12b and an autonomous crane 12c are depicted representing autonomously operating machines 12 in the meaning of the present disclosure. Each autonomously operating machine 12 is configured to perform a predefined task essentially without any dedicated control by an operator. In the given example the automated guided vehicles 12a, 12b may be configured to transport goods or material to and from the crane 12a, 12b autonomously, while the crane 12c is configured to lift the goods or material from the automated guided vehicles 12a, 12b.

The autonomously operating machines 12 are in this exemplary embodiment confined to a defined workspace 16 (indicated here by the dashed line), in which they can operate freely. The automated guided vehicles 12a, 12b may thus move freely without fixed routes in order to transport their cargo. The crane 12c is a fixed installation within the workspace 16, yet the crane 12c is able to operate its boom 18 without any restrictions within a defined work area 20.

In the present scenario the workspace 16 is surrounded by a fence 22 in order to restrict access to the workspace 16. A safety controller 24 monitors the workspace 16 and prevents any danger related to movements of objects in the workspace 16. In one exemplary embodiment the safety controller can be a simple safety switching device which shuts down any installation within the workspace 16 if an undefined movement is detected. In another embodiment the safety controller 24 is a configurable safety controller or a programmable safety controller implementing a sophisticated safety control function. The safety control function may evaluate multiple sensors that are associated to the workspace 16 or the machines working within. Further, the safety control function may assert control in various ways, for instance, by locking the workspace 16 to deny access to it, by disconnecting one or more installation from the power supply to shut them down, or by controlling the current process of an installation to bring it into a safe sate.

The safety controller 24 may receive input signals from various signaling devices such as safety cameras 26, light barriers 28, safety mats 30 or emergency stop buttons 32. The input signals may be evaluated by a failsafe evaluation unit 34 individually or in combination in order to determine whether a safety breach has occurred. If a breach is detected the safety controller 24 may be configured to shut down the relevant installation in a failsafe manner as indicted here by contactors 36 placed within a power supply of the drives 38 of the installation.

The system 10 in accordance with the present disclosure also includes additional safety equipment for operators 40 required to work within the same workspace 16 as the autonomously operated machines 12. The additional safety equipment is a body-worn device 42 that is attached to the operator's body in a predefined manner. In the exemplary embodiment according to FIG. 1, the body-worn device 42 is a wristband that an operator wears around his wrist or ankle.

The body-worn device 42 is configured similarly to the other safety equipment 26, 28, 30, 32 and provides an input signal to the safety controller 24, The input signal from the body-worn device 42 can be provided in addition to the other safety equipment 26, 28, 30, 32. The body-worn device 42 is configured to provide the input signal in a failsafe manner. Accordingly, the body-worn device 42 comprises additional safety means for ensuring failsafe locking and arrangement of the body-worn device 42 in the predefined manner.

The safety means may inter alia include sensors for determining independently from a locking device of the body-worn device 42 whether the body-worn device 42 is arranged on the person in the predefined manner. In an embodiment a sensor can detect vital signs of the person when the body-worn device is arranged on the body in the predefined manner. For instance, the body-worn device could be a wristband having a heartbeat sensor on a surface facing the operator's skin that detects a heartbeat only when the wristband is securely locked around the wrist or the ankle of the operator. Thereby, it can be ensured that the body-worn device 42 is not only locked, but also arranged in the predefined manner.

It shall be noted that the body-worn device 42 is not limited to the above mentioned wristband. Other embodiments of the body-worn device 42 such as dedicated work suits, helmets, shoes or gloves are conceivable as well.

Furthermore, these embodiments may have other sensor in order to determine the correct locking or arrangement of the body-worn device 42 on an operator 42. Conceivable are for instance pressure sensors, electrical sensors, or a combination of multiple different sensor, which determine if the body-worn device 42 is placed and used correctly, for instance, by determining skin contact. Ultimately, the body-worn device 42 may be an implant which is implanted under the skin of the operator and which provides an input signal when it is correctly placed and operating.

Furthermore, in different scenario, the operator may be required to wear two body-worn devices, for instance on both hands. This has the advantage that not only the body, but also body parts could be safeguarded as well e.g. two wrists and hands when two body-worn devices are connected to the appropriate places.

Regardless of the actual design, the body-worn device 42 should further be designed to be intrinsically failsafe like other safety devices. Therefore, the body worn device 42 can comprise an evaluation unit for evaluating a status of the device in a failsafe manner. This may be achieved by a dual or multi-channel evaluation unit comprising two or more individual processing units which evaluate the associated safety sensor individually. It shall be noted that a failsafe evaluation is not limited to a multi-channel design. Other means are conceivable such as dedicated safety chips which include intrinsic safety functions ensuring a failsafe evaluation.

The safety concepts achievable with the body-worn devices 42 according to the present invention are manifold.

With the body-worn device 42, the operator becomes part of the overall safety system and enables a more flexible safety concept. In particular, it is possible for the operator wearing the device 42 to enter the workspace 16 without the autonomously operating machines having to stop their operation. In other words the body-worn device 42 allows an operator to cooperate with the autonomously operating machine in a common workspace 16.

In one embodiment the safety controller 24 may be configured to determine a position of the body-worn device 42 in a defined work area 20 of the autonomously operating machine 12. Based on the determined position the safety controller 24 is capable of asserting selective control over the autonomously operating machines 12 in the workspace 16. For instance, the safety controller 24 may be configured to only shut down or halt the autonomously operating machine 12, in whose work area 20 the body-worn device 42 is currently located. Other autonomously operating machines 12 in the same workspace 16 may continue their operation with reduced speed or without any interruption at all.

In order to determine the position of the body-worn device 42 and therewith the current position of the operator 40, the body-worn device 42 may comprise location means such as a GPS module capable of determining its absolute position. Alternatively, the body-worn device 42 may comprise location means which are configured to determine the current position of the body-worn device 42 relative to certain landmarks such as radio beacons in the workspace 16. In another embodiment the system is configured to locate the body-worn device 42 based on indoor navigation means using a dedicated short-range radio communication network. Alternatively, the autonomously operating machines 12 can be configured themselves to detect and identify a body-worn device 42 within in their associated work areas 20.

Furthermore, in an embodiment, the safety controller 24 can further be configured to log and trace the body-worn device 42 within the defined workspace 16. Logging in this context means that the safety controller 24 registers each body-worn device 42 either automatically or manually, and only grants access to the workspace 16 to operators having logged-in devices. Furthermore, the safety controller 24 may keep track of the logged-in body-worn devices 42 and may execute a safety function if it loses contact to one of the logged-in body-worn devices 42. In an embodiment, the safety controller 24 can combine the log-in data with positional data in order to determine if the body-worn device 42 is within or outside of the workspace 16. This reduces the requirements for fixed installations around the workspace 16.

Figure 2:
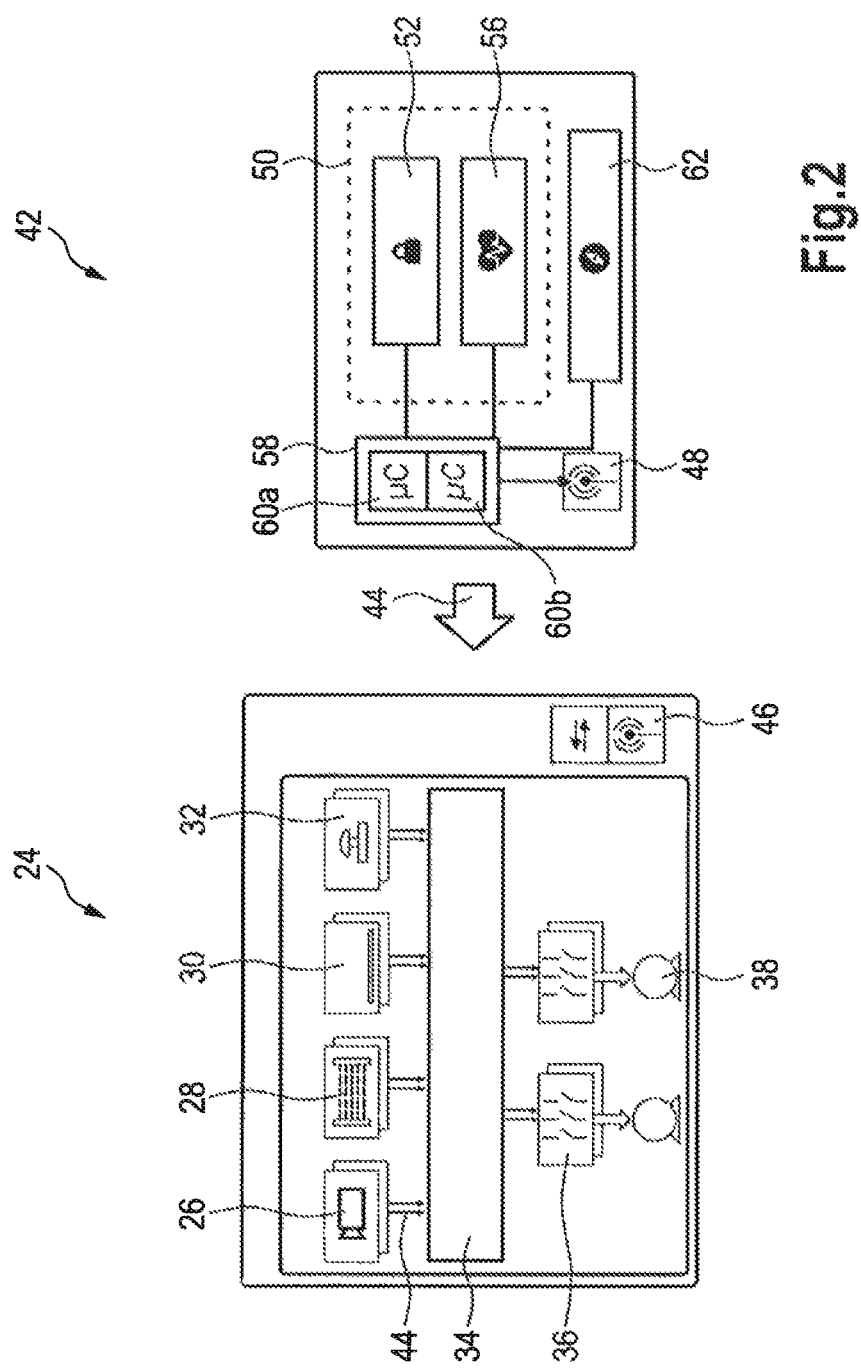
FIG. 2 shows in a schematic diagram an exemplary embodiment of the disclosed system.

FIG. 2 shows in a schematic diagram an exemplary embodiment of the disclosed system. The same reference signs denote the same parts as with regard to FIG. 1.

In FIG. 2, embodiments of the safety controller 24 and the body-worn device 42 are shown. The safety controller 24 can be a configurable safety controller that combines multiple input signals from various safety sensors. The safety sensors are, for instance, safety cameras 26, light barriers 28, safety mats 30 or emergency stop buttons 32 which are located around the workspace and the technical installations. Each sensor provides an input signal 44 in a failsafe manner (denoted here by the double arrow) to an evaluation unit 34.

The evaluation unit 34 evaluates the input signals 44 and controls in this embodiment contactors 36 in a power supply of the drives 38 of the technical installations. The safety controller 24 can be configured to energize the contactors 36 only when the input signals 44 from the sensors 26, 28, 30, 32 are correctly received. Therefore, in case an input signal 44 is interrupted, the technical installation will be disconnected from the power supply and thus switched off or at least no longer be able to start.

The safety controller 24 may further comprise a communication interface 46. The communication interface 46 may include terminals, to which the sensors 26, 28, 30, 32 can be connected via individual wires. Alternatively, the communication interface 46 can be a bus interface, via which the safety controller 24 is able to connect to a bus. The bus can be a dedicated safety bus, which connects the sensors 26, 28, 30, 32 and the actors such as the contactors 36 to the safety controller 24.

Furthermore, the communication interface 46 may comprise a wireless interface for connecting sensors wirelessly to the safety controller 24. The wireless interface can be any known wireless interface such as WIFI, Bluetooth or any other dedicated radio communication interface. Sensors connected to the wireless interface essentially operate in the same manner as wired sensors. In case an input signal 44 is not received from the wirelessly connected sensor, the safety controller 24 carries out the safety function. It is shall be noted that in case of wireless transmission of the input signal 44, further checks may be implemented to verify whether the input signal is received correctly. For instance, a dynamic input signal may be used as an input signal.

The body-worn device 42 essentially represents a further sensor that is evaluated by the safety controller 24. Like the other sensors 26, 28, 30, 32, the body-worn device 42 is also a failsafe sensor. Therefore, the body-worn device 42 has to be designed such that any errors of the device are detected by the safety controller 24. In other words, if the body-worn device 42 should fail in any way, the safety controller 24 must perform its safety function.

Since the body-worn device 42 can be connected to the safety controller 24 via a wireless interface 48, the body-worn device 42 itself must ensure safe generation of the input signal, which is transmitted from the body-worn device 42 to the safety controller 24. The body-worn device 42 according to the present invention, hence, comprises safety means 50 that ensure failsafe provision of the input signal. These safety means 50 may be implemented in various ways and may dependent on the safety level that has to be realized by the body-worn device 42.

The safety means 50 may comprise an interlocking device 52 for locking the body-worn device on the person in a predefined manner. The interlocking device 52 could be a clasp, a buckle or the like with a sensor providing an enable signal 54 if the interlocking device 52 is locked correctly. In addition, the body-worn device 42 may comprise a further sensor 56 for determining whether the body-worn device 42 is arranged on the person in the predefined manner. The further sensor 56 can be independent form the interlocking device and configured to detect a vital sign of the person, for instance the heartbeat of the person, only when the body-worn device 42 is arranged correctly in the predefined manner. The further sensor 56 can be configured to provide an additional enable signal if the body-worn device 42 is arranged correctly or to block any enable signal from the interlocking device 52 if it is detected that the body-worn device 42 is not arranged in the predefined manner.

The safety means 50 may further comprise an evaluation unit 58 for evaluating the status of the body-worn device in a failsafe manner. The evaluation unit 58 can be of redundant design comprising two individual processing units 60*a*, 60*b*. The individual processing units 60*a*, 60*b* can further be integrated circuits or microcontrollers with the same functionality, but from different manufacturers (as indicated here by the different type face). Thereby, diversity may be increased. The individual processing units 60*a*, 60*b* can be configured to monitor each other and to crosscheck their individual inputs.

If the evaluation unit 58 determines that the body-worn device 42 is arranged correctly on the operator, it enables the input signal 44 to be transmitted to the safety controller 24. The safety controller 24 handles the input signal 44 from the body-worn device 42 as any other input signal 44 provided by the other sensors 26, 28, 30, 32.

The body-worn device 42 may further comprise positioning means 62 to determine a position of the body-worn device 42 within a defined area such as the working space 16. The positioning means 62 may be configured to actively determine the current, absolute position of the body-worn device 42 using for instance a GPS module and to transmit the determined position data to the safety controller 24. The position data can be used to assess, how safety of the operator, who wears the body-worn device 42, can be effectively guaranteed. Furthermore, the safety controller 24 can use the position data to determine if the body-worn device 24 is currently located in a defined workspace or to trace the body-worn device 42 in the defined workspace 16.

Alternatively or in addition, the positioning means 62 may also be configured to enable other devices such as receivers (beacons) arranged within the workspace or on the autonomously operating machines to be able to detect and locate the body-worn device 42. In this case the positioning means 62 may comprise active or passive transmitters/receivers, which interact with transmitters/receivers, for instance transmitters/receivers of an indoor navigation system. Relying on an indoor navigation system has the advantage that no additional infrastructure may be required and the positioning means 62 of the body-worn device 42 can be rather simple and inexpensive. It shall be noted that for enhance safety the various positioning means 62 may also be combined in order to crosscheck the plausibility of the determine position of the individual positioning means.

Figure 3:
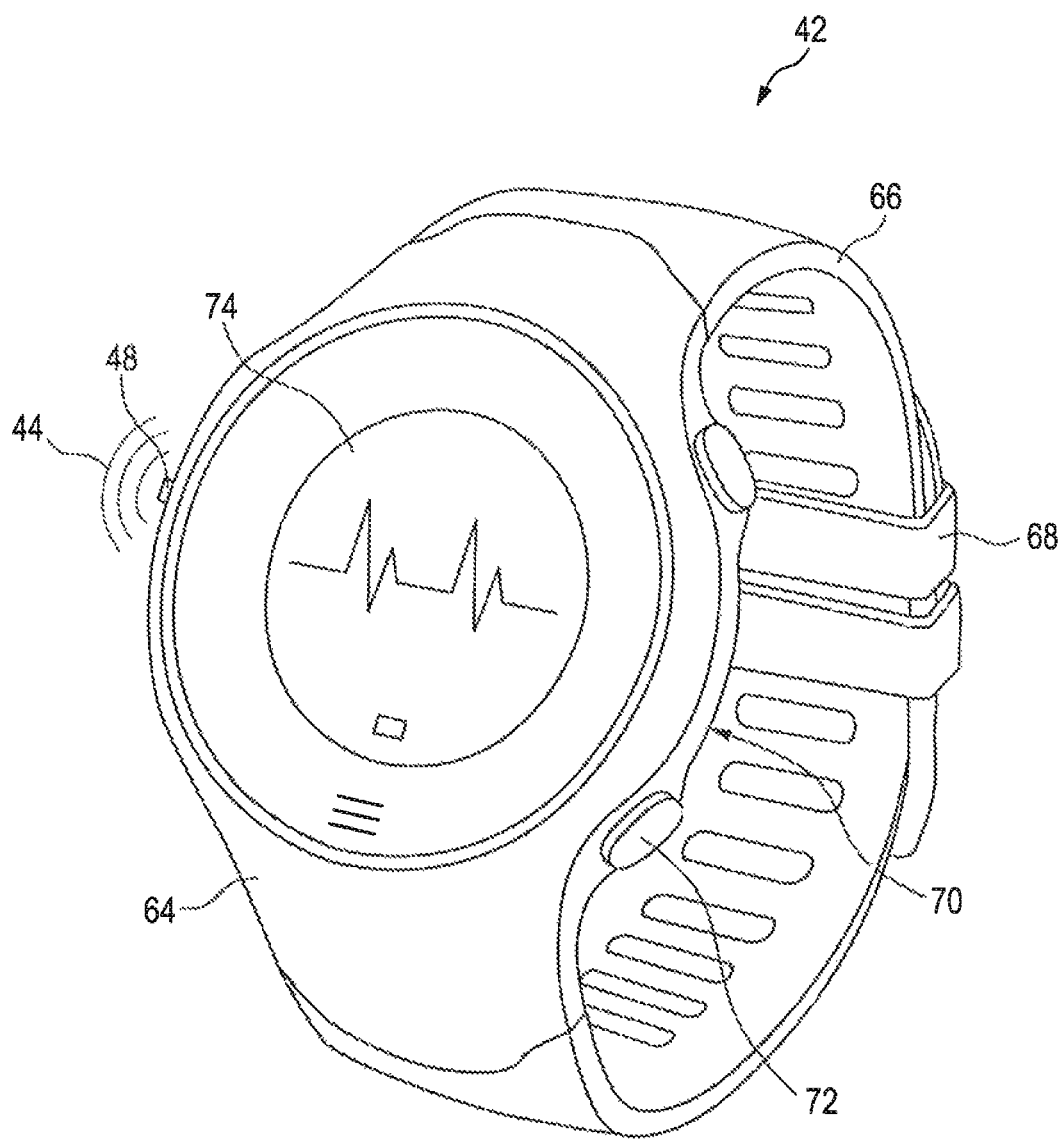
FIG. 3 shows an exemplary embodiment of a body-worn device.

FIG. 3 shows an exemplary embodiment of a body-worn device 42. The body-worn device 42 is here a watch-like device with a control unit 64 and a wristband 66 attached thereto. The wristband 66 is designed such that it can be worn by a person around the wrist or ankle. With a clasp 68 on the wristband 66, the body-worn device 42 can be securely fixed. The clasp 68 represents part of an interlocking device in the meaning of the present disclosure. The control unit 64 comprises an evaluation unit which is configured to determine in a failsafe manner if the clasp 68 is correctly closed.

Furthermore, the body-worn device 42 in this embodiment comprises a heartbeat sensor, which is located here on the back 70 of the control unit 64. The sensor may use photoplethysmography (PPG) to determine the heartbeat. Thus, the sensor may comprise one or more green LED lights arranged on the back 70 of the control unit 64 and photodiodes to measure the light absorption of the green light. The body-worn device 42 is correctly arranged in the predefined manner when the clasp 68 is locked and the heartbeat sensor is detecting a heartbeat of the person wearing the device. The control unit 64 is configured to evaluate the status of the interlocking device and the heartbeat sensor and to transmit based on the evaluation an input signal 44 to a safety controller (not depicted here) using a wireless communication interface 48.

The body-worn device 42 in this embodiment further comprises an optional user interface having input buttons 72 and a display 74. The display 74 can be used to display a variety of information, for instance the current status of the safety means 50, the status of the link to the safety controller, or the status of the clasp 68 or heartbeat sensor. The input buttons 72 may be used by an operator to control the body-worn device 42. For instance, in one embodiment the input buttons 72 can be used to actively register the body-worn device 42 with the safety controller 24.

It shall be noted that the above described embodiment is only one example of the body-worn device 42 according to the present disclosure. Different embodiments are conceivable. In particular, the safety means may be configured differently in other embodiments with additional or different sensors or in other combination depending on the safety level to be achieved by the body-worn device 42.

Figure 4:
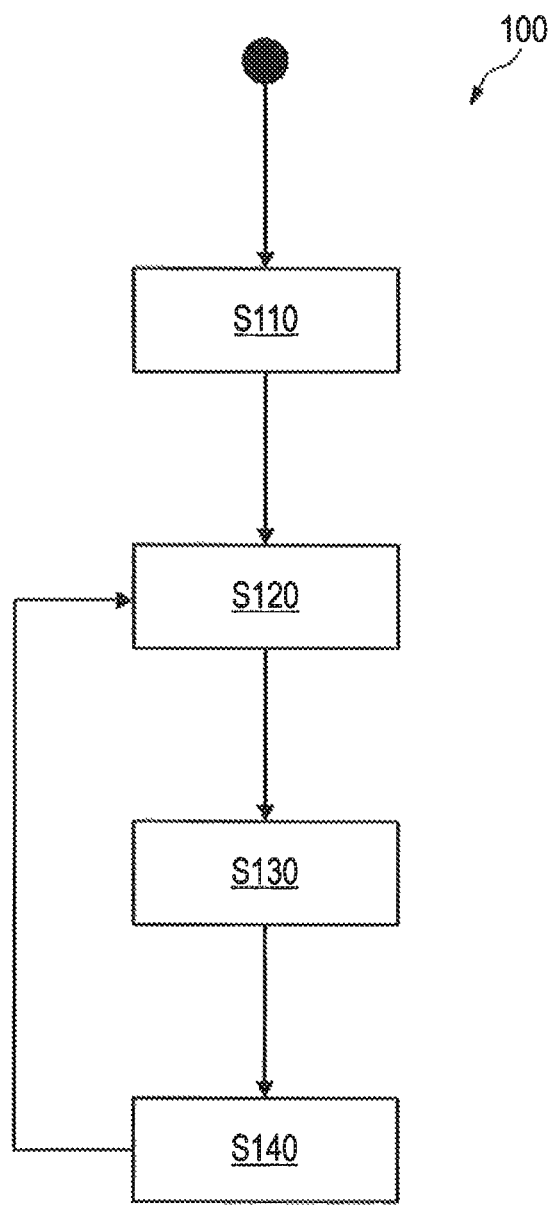
FIG. 4 shows in a flow chart an exemplary embodiment of the disclosed method.

FIG. 4 shows in a flow chart an exemplary embodiment of the new method. The method is denoted here in its entirety with reference numeral 100.

The method is performed utilizing a safety controller and a body-worn device.

In step S110 the body-worn device is locked and arranged on the person in a predefined manner.

Next, in step S120, safety means associated with the body-worn device detect and verify in a failsafe manner, whether the device is correctly locked and arranged in the predefined manner.

If correct arrangement of the body-worn device is detected, in step S130, the body-worn device generates an input signal and transmits the input signal to the safety controller.

In step S140, the safety controller asserts control over an autonomously operating machine that operates in a defined workspace based on the input signal.

The steps S120 to S140 can be repeated continuously.

In case the body-worn device fails or the safety means of the body-worn device holds back the input signal, the safety controller will react and put the autonomously operating machine in a safe state.

It shall be noted that the method may include further steps in other forms of execution before, at the end or in between in order to implement the various safety concepts suggested with regard to the description of the system, the body-worn device, or the safety controller.

Finally it shall be noted that elements of the disclosed devices and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

What is claimed is:

1. A system for safeguarding one or more persons from an autonomously operating machine that operates in a predefined workspace, the system comprising:
   at least one body-worn device, wherein each body-worn device is configured as a safety sensor and
   a safety controller configured to:
      combine a plurality of input signals from a plurality of safety sensors and
      execute a safety function that asserts control over the autonomously operating machine based on the plurality of input signals,
   wherein each body-worn device is configured to generate a respective one of the plurality of input signals for the safety controller and
   wherein the each body-worn device comprises a safety device configured to:
      ensure failsafe locking and arrangement of the body-worn device on a person wearing the body-worn device in a predefined manner and
      generate, in response to the body-worn device being locked and arranged in the predefined manner, the respective one of the plurality of input signals.

2. The system of claim 1, wherein the safety device of each body-worn device comprises a failsafe interlocking device configured to lock the body-worn device on the person in the predefined manner.

3. The system of claim 1, wherein the safety device of each body worn device comprises a sensor configured to determine whether the body-worn device is arranged on the person in the predefined manner.

4. The system of claim 3, wherein the sensor of each body-worn device is configured to detect a vital sign of the person only when the body-worn device is locked in the predefined manner.

5. The system of claim 4, wherein the vital sign is a heartbeat of the person.

6. The system of claim 1, wherein each body-worn device comprises an evaluation unit configured to evaluate a status of the safety device of the body-worn device in a failsafe manner.

7. The system of claim 6, wherein the evaluation unit comprises two individual processing units configured to be redundant with each other.

8. The system of claim 1, wherein the safety controller is further configured to:
   determine a position of each body-worn device in a defined surrounding of the autonomously operating machine and
   control the autonomously operating machine based on the determined position.

9. The system of claim 8, wherein:
   each body-worn device comprises a positioning device configured to determine a current position of the body-worn device and
   each body-worn device is configured to transmit the determined current position to the safety controller.

10. The system of claim 1, wherein the autonomously operating machine is configured to:
    determine whether each body-worn device is within a defined surrounding of the autonomously operating machine and
    assert control over the autonomously operating machine in conjunction with or independently of the safety controller.

11. The system of claim 1, wherein:
    each body-worn device comprises a communication device configured to communicate via a radio communication network and
    the system further comprises one or more receivers associated with the safety controller and configured to communicate with each body-worn device via the radio communication network.

12. The system of claim 11, wherein the safety controller is configured to:
    determine a location of each body-worn device relative to components of the radio communication network and
    assert control based on the determined location.

13. The system of claim 11, wherein the radio communication network is a dedicated short-range radio communication network using ultra wide band technology.

14. The system of claim 1, wherein the safety controller is configured to log in and trace each body-worn device within a defined workspace in which the autonomously operating machine operates.

15. The system of claim 14, wherein the safety controller is further configured to:
    control access to the defined workspace and
    allow access only to persons having respective ones of the body-worn devices.

16. The system of claim 15, wherein:
    the safety function is configured to transfer the autonomously operating machine into a safe state and
    the safety controller is configured to, for each logged-in body-worn device, execute the safety function in response to interruption of the respective input signal being received from the logged-in body-worn device.

17. The system of claim 16, wherein the safe state comprises the autonomously operating machine being stopped safely.

18. The system of claim 1, wherein the safety controller is further configured to, for each body-worn device:
    register the body-worn device either automatically or manually,
    grant the person wearing the body-worn device access to the workspace only when the body-worn device is registered,
    track the registered body-worn device within the workspace, and
    execute the safety function in response to losing contact with the body-worn device.

19. A body-worn device for safeguarding a person from an autonomously operating machine that operates in a predefined workspace, the body-worn device comprising:
- a safety device configured to ensure failsafe locking and arrangement of the body-worn device on the person in a predefined manner and
- a transmitting device configured to, only in response to the body-worn device being locked and arranged in the predefined manner, generate an input signal to a safety controller that combines a plurality of plurality of input signals from a plurality of safety sensors and executes a safety function that asserts control over the autonomously operating machine based on the plurality of input signals.

20. A method for safeguarding one or more persons from an autonomously operating machine that operates in a predefined workspace, the method comprising:
- by a safety controller, combining a plurality of input signals from a plurality of safety sensors;
- by each of at least one body-worn device:
    - ensuring, using a safety device of the body-worn device, failsafe locking and arrangement of the body-worn device on a person wearing the body-worn device in a predefined manner and
    - generating, in response to the body-worn device being locked and arranged in a predefined manner, one of the plurality of input signals; and
- asserting control, by the safety controller, over the autonomously operating machine based on the plurality of input signals.

* * * * *

UNITED STATES PATENT AND TRADEMARK OFFICE
CERTIFICATE OF CORRECTION

Page 1 of 1

PATENT NO. : 10,909,439 B2
APPLICATION NO. : 16/274515
DATED : February 2, 2021
INVENTOR(S) : Jan Tournois et al.

It is certified that error appears in the above-identified patent and that said Letters Patent is hereby corrected as shown below:

In the Claims

Claim 1, Column 11 Line 39    "wherein the" should be --wherein--

Claim 19, Column 13 Line 10    "plurality of plurality of" should be --plurality of--

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*